(12) United States Patent
Shieh et al.

(10) Patent No.: US 9,348,995 B2
(45) Date of Patent: May 24, 2016

(54) NONVOLATILE MEMORY DEVICE HAVING AUTHENTICATION, AND METHODS OF OPERATION AND MANUFACTURE THEREOF

(71) Applicant: Winbond Electronics Corporation, Taichung (TW)

(72) Inventors: Ming-Huei Shieh, Cupertino, CA (US); Krishna Chandra Shekar, Fremont, CA (US); Hui Chen, San Ramon, CA (US)

(73) Assignee: WINBOND ELECTRONICS CORPORATION, Taichung (TW)

( * ) Notice: Subject to any disclaimer, the term of this patent is extended or adjusted under 35 U.S.C. 154(b) by 0 days.

(21) Appl. No.: 14/706,305

(22) Filed: May 7, 2015

(65) Prior Publication Data
US 2015/0310203 A1 Oct. 29, 2015

Related U.S. Application Data

(62) Division of application No. 13/780,803, filed on Feb. 28, 2013, now Pat. No. 9,053,317.

(51) Int. Cl.
*G06F 7/04* (2006.01)
*G06F 21/44* (2013.01)
(Continued)

(52) U.S. Cl.
CPC .............. *G06F 21/44* (2013.01); *G06F 21/79* (2013.01); *G06K 19/07745* (2013.01); *H01L 24/49* (2013.01); *H04L 9/0894* (2013.01); *H01L 2224/05554* (2013.01); *H01L 2224/05644* (2013.01); *H01L 2224/32145* (2013.01); *H01L 2224/32245* (2013.01); *H01L 2224/48091* (2013.01); *H01L 2224/48145* (2013.01);
(Continued)

(58) Field of Classification Search
CPC ................................. G06F 21/30; G06F 21/44
USPC .................................................................. 726/2
See application file for complete search history.

(56) References Cited

U.S. PATENT DOCUMENTS

| | | |
|---|---|---|
| 5,844,986 A | 12/1998 | Davis |
| 7,454,556 B1 | 11/2008 | Knapp |

(Continued)

OTHER PUBLICATIONS

Atmel Corporation. Atmel ATAES132, 32K AES Serial EEPROM Specification, Preliminary Datasheet, Rev.: 8760A-CRYPTO-5/11, 2011. 166 Pages.

(Continued)

*Primary Examiner* — Anthony Brown
(74) *Attorney, Agent, or Firm* — David H. Carroll

(57) ABSTRACT

A memory device package encloses two separate die, one being a standard nonvolatile memory integrated circuit ("IC") die, and the other being any suitable authentication IC die. Either die may be stacked upon the other, or the die may be placed side-by-side. The external contacts may correspond to the power and signal requirements of the standard nonvolatile memory IC die so that the pin-out of the memory device package may present a standard pinout. The power and signal requirements of the authentication IC die may be satisfied with some or all of the pins for the nonvolatile memory integrated circuit die, or with other unused pins of the device package. One or more additional external contacts may be added exclusively for the authentication integrated circuit die. One or more signals may be dedicated as between the standard nonvolatile memory IC die and the authentication IC die.

4 Claims, 12 Drawing Sheets

(51) Int. Cl.
*G06F 21/79* (2013.01)
*G06K 19/077* (2006.01)
*H04L 9/08* (2006.01)
*H01L 23/00* (2006.01)

(52) U.S. Cl.
CPC ............ *H01L2224/48247* (2013.01); *H01L 2224/48464* (2013.01); *H01L 2224/49113* (2013.01); *H01L 2224/73265* (2013.01); *H01L 2224/85399* (2013.01); *H01L 2924/00014* (2013.01); *H01L 2924/181* (2013.01)

(56) References Cited

U.S. PATENT DOCUMENTS

| | | | |
|---|---|---|---|
| 7,558,900 | B2 | 7/2009 | Jigour et al. |
| 9,053,317 | B2 | 6/2015 | Shieh et al. |
| 2002/0004905 | A1 | 1/2002 | Davis et al. |
| 2003/0212871 | A1 | 11/2003 | Suzuki et al. |
| 2008/0080255 | A1 | 4/2008 | Kagan et al. |
| 2009/0217058 | A1 | 8/2009 | Obereiner et al. |
| 2011/0246707 | A1 | 10/2011 | Ito |
| 2011/0280402 | A1 | 11/2011 | Ibrahim et al. |

OTHER PUBLICATIONS

Atmel Corporation. Atmel ATAES132, 32Kb AES Serial EEPROM Specification, SPI Datasheet Summary, Rev.: 8763A-CRYPTO-5/11, 2011. 13 Pages.

Atmel Corporation. Atmel AVR231: AES Bootloader, 8-bit Atmel Microcontrollers, Application Note, 2589E-AVR-03/12, 2012. 31 Pages.

Atmel Corporation. Atmel Cypto Products Portfolio, Rev.: 8705C-CRYPTO-3/11, 2011. 8 Pages.

Atmel Corporation. Atmel CyptoMemory Specification Datasheet, AT88SC0104C, AT88SC1616C, AT88SC0204C, AT88SC3216C, AT88SC0404C, AT88SC6416C, AT88SC0808C, AT88SC12816C, AT88SC25616C, Rev.: 5211D-CRYPTO-12/11, 2011. 69 Pages.

Atmel Corporation. CryptoAuthentication Product Uses, AT88SA10HS, AT88SA102S Application Note, 8663B-SMSM-03/09, 2009. 18 Pages.

Atmel Corporation. CryptoMemory 256 Kbit, AT88SC25616C Summary, 5017KS-SMEM-08/09, 2009. 20 Pages.

Cooper, David et al. BIOS Protection Guidelines, National Institute of Standards and Technology, Special Publication 800-147, Apr. 2011. 26 pages.

Davis, Kevin. UEFI Fall Plugfest: UEFI Security Enhancements, Insyde Software, Oct. 2011. 21 Pages.

Microsoft Corporation. Introduction to Code Signing [online], 2013 [retrieved on Feb. 13, 2013]. Retrieved from the Internet: <URL: http://msdn.microsoft.com/en-us/library/ms537361(v=vs.85).aspx>. 7 Pages.

National Institute of Standards and Technology. The Keyed-Hash Message Authentication Code (HMAC), Federal Information Processing Standards Publication 198-1, Jul. 2008. 13 pages.

Network Associates, Inc. Introduction to Cryptography, Chapter 1, How PGP Works [online], 1999 [retrieved on Feb. 14, 2013]. Retrieved from the Internet: <URL: http://www.pgpi.org/doc/pgpintro>. 23 Pages.

Sarmenta, Luis F. G. et al. Virtual Monotonic Counters and Count-Limited Objects using a TPM without a Trusted OS, ACM, 2006. 15 Pages.

Taiwan Intellectual Property Office. Office Action: Taiwan Patent Application No. 102125048, Jul. 13, 2015. 27 Pages.

Trusted Computing Group Incorporated. TMP Main Specification [online], 2013 [retrieved on Jan. 16, 2013]. Retrieved from the Internet: <URL: http://www.trustedcomputinggroup.org/resources/tmp_main_specification>. 2 Pages.

Trusted Computing Group Incorporated.TMP; Main Part 1 Design Principles, Specification Version 1.2, Revision 116, Mar. 1, 2011. 184 Pages.

Wikipedia. Hash-based message authentication code [online], undated [retrieved on Jan. 16, 2013]. Retrieved from the Internet: <URL: http://en.wikipedia.org/wiki/Hash-based_message_authentication_code>. 5 Pages.

Wikipedia. RSA numbers [online], undated [retrieved on Jan. 16, 2013]. Retrieved from the Internet: <URL; http://en.wikipedia.org/wiki/RSA_numbers>. 18 Pages.

Wikipedia. Replay attack [online], undated [retrieved on Jan. 16, 2013]. Retrieved from the Internet: <URL: http://en.wikipedia.org/wiki/Replay_attack>, 2 Pages.

Winbond Electronics Corporation. Reply: Taiwan Patent Application No. 102025048, Sep. 2, 2015. 7 Pages.

Winbond Electronics Corporation. W25Q128FV spiflash 3V 128M-Bit Serial Flash Memory with Dual/Quad SPI and QPI, Revision D, Oct. 1, 2012. 97 pages.

Xorbin. SHA-256 hash calculator [online], undated [retrieved on Jan. 16, 2013]. Retrieved from the Internet: <URL:http://www.xorbin.com/tools/sha256-hash-calculator>. 3 Pages.

NONVOLATILE MEMORY DEVICE HAVING AUTHENTICATION, AND METHODS OF OPERATION AND MANUFACTURE THEREOF

CROSS-REFERENCE TO RELATED APPLICATIONS

This application is a division of U.S. patent application Ser. No. 13/780,803 filed Feb. 28, 2013, which hereby is incorporated herein in its entirety by reference thereto.

BACKGROUND OF THE INVENTION

1. Field of the Invention

The present invention relates to digital memory devices, and more particularly to nonvolatile memory devices that may be authenticated, and methods of operation and manufacture thereof.

2. Description of Related Art

Nonvolatile memory generally, and especially flash memory of all types including NOR and NAND memory types, have become increasingly popular due to their significant cost advantage. Flash memory is now available in a variety of different interfaces, ranging from traditional NAND interfaces to low pin count serial NAND interfaces, and Serial Peripheral Interfaces ("SPI") including single, dual and quad SPI, and Quad Peripheral Interface ("QPI"). An example of one such successful serial flash memory device is SPIFLASH (®) product number W25Q128FV available from Winbond Electronics Corporation of San Jose, Calif., USA; see Winbond Electronics Corporation, Datasheet: SpiFlash 3V 128M-Bit Serial Flash Memory with Dual/Quad SPI & QPI, Revision D, Oct. 1, 2012.

Nonvolatile memory is used extensively in today's digital electronic equipment including personal computer systems and workstations; mobile communications devices including cell phones, smartphones, phablets, and tablets; entertainment systems such as MP3 players and gaming devices; medical device controllers; and cloud systems. The security of information stored on this nonvolatile memory is a concern throughout the computer industry. Addressing the security vulnerabilities of such digital electronic equipment is an integral part of maintaining an operational industry.

The nonvolatile memory used in much of this digital electronic equipment is packaged apart from the processor (microprocessor or controller) which runs the computer code and accesses digital data stored in the nonvolatile memory. This separate packaging presents security vulnerabilities. With reference to FIG. 1, the code and/or data may be maliciously accessed and/or modified in a number of ways, such as, for example, tapping into one or more lines 14 such as data in "DI" and data out "DO" between a system controller 10 and a nonvolatile memory device 12, connecting a probe directly to one or more pins extending from the packaged nonvolatile memory device 12, forcibly reading and perhaps modifying the contents of the packaged nonvolatile memory device 12 while installed in the digital electronic equipment, and physically removing the nonvolatile memory device 12 from the digital electronic equipment to read and perhaps modify the contents.

Nonvolatile memory devices are commonly used to store executable code for all types of applications, including set top boxes, mobile phones, personal computers, modems, and so forth, along with multiple different applications. One type of code commonly stored on nonvolatile memory devices, and in particular on flash memory devices for personal computers, is commonly known as the Basic Input/Output System ("BIOS") code. The BIOS code facilitates the hardware initialization process and transition control to the operating system. Unauthorized modification of BIOS by malicious act constitutes a significant threat because of the BIOS's unique and privileged position within the system architecture. BIOS security is addressed in David Cooper et al., BIOS Protection Guidelines: Special Publication 800-147, National Institute of Standards and Technology ("NIST"), April 2011.

FIG. 2 shows an example of a subsystem 20 to prevent unauthorized modification of BIOS program code embedded in modifiable nonvolatile memory devices such as flash memory, which is further disclosed in U.S. Pat. No. 5,844,986 issued Dec. 1, 1998 to Davis. A cryptographic coprocessor 25 resides on system bus 24, along with host processor 21 and system memory 23 via a chipset (interface) 22. The cryptographic coprocessor 25 includes a bus interface 26, a processing unit 27, and a nonvolatile memory 28 which contains the BIOS program code 29, and performs authentication and validation on a BIOS upgrade based on a public/private key protocol. The authentication is performed by verifying the digital signature embedded in the BIOS upgrade. Although the host processor 21 is shown separate from the cryptographic coprocessor 25, the cryptographic coprocessor 25 may be part of the host processor 21. In this case, the host processor 21 accesses the BIOS program code 29 directly without going through the system bus 24.

While the security engine which performs the cryptographic processing and the nonvolatile memory which stores the program code and/or data to be secured may be separate and discrete devices, it is also possible to implement nonvolatile memory such as serial flash memory as well as the security engine as a single integrated circuit on one substrate.

BRIEF SUMMARY OF THE INVENTION

One embodiment of the present invention is a memory device comprising: a package body; a nonvolatile memory integrated circuit die contained in the package body and comprising a first interface, control logic coupled to the first interface, and a nonvolatile memory array coupled to the control logic and to the first interface; an authentication integrated circuit die contained in the package body and comprising a second interface, an authentication engine coupled to the second interface, a volatile memory register coupled to the authentication engine, and a nonvolatile memory array coupled to the authentication engine and to the second interface; and contacts extending from or disposed on the package body and electrically coupled to the first interface and to the second interface.

Another embodiment of the present invention is a method of authenticating a nonvolatile memory integrated circuit die contained in a package body having a plurality of contacts extending from or disposed on the package body, the nonvolatile memory integrated circuit die having a first interface electrically coupled to at least some of the contacts, comprising: storing a root key in a nonvolatile memory array of an authentication integrated circuit die contained in the package body, the authentication integrated circuit die further comprising a second interface and an authentication engine coupled to the second interface, the nonvolatile memory array being coupled to the authentication engine and to the second interface; maintaining a monotonic count within the nonvolatile memory array of the authentication integrated circuit die; encrypting the monotonic count within the authentication engine to generate an encrypted count; and furnishing the encrypted count from the authentication engine to one of the contacts via the second interface, the second interface being electrically coupled to at least some of the contacts.

Another embodiment of the present invention is a method of authenticating a nonvolatile memory integrated circuit die contained in a package body having a plurality of contacts extending from or disposed on the package body, the nonvolatile memory integrated circuit die having a first interface electrically coupled to at least some of the contacts, comprising: storing a root key in a nonvolatile memory array of an authentication integrated circuit die contained in the package body, the authentication integrated circuit die further comprising a second interface, an authentication engine coupled to the second interface, and a volatile memory register coupled to the authentication engine, the nonvolatile memory array being coupled to the authentication engine and to the second interface; maintaining a monotonic count within the nonvolatile memory array of the authentication integrated circuit die; receiving, by the authentication integrated circuit die, a request associated with a keyed-HMAC for providing the monotonic count; furnishing the monotonic count from the authentication engine to one of the contacts via the second interface, the second interface being electrically coupled to at least some of the contacts; receiving, by the authentication integrated circuit die, a request associated with the keyed-HMAC for incrementing the monotonic count; and incrementing the monotonic count in the authentication integrated circuit die.

Another embodiment of the present invention is a method of manufacturing memory device comprising: stacking together a standard nonvolatile memory integrated circuit die and an authentication integrated circuit die to form a die-on-die stack, the standard nonvolatile memory integrated circuit die comprising a first interface, control logic coupled to the first interface, and a nonvolatile memory array coupled to the control logic and to the first interface, and the authentication integrated circuit die comprising a second interface, an authentication engine coupled to the second interface, a volatile memory register coupled to the authentication engine, and a nonvolatile memory array coupled to the authentication engine and to the second interface; electrically coupling a plurality of contacts to the first interface and to the second interface; and encapsulating the die-on-die stack in a package body, the contacts extending from or being disposed on the package body.

DETAILED DESCRIPTION OF THE INVENTION INCLUDING THE BEST MODE

While the security engine which performs the cryptographic processing and the nonvolatile memory which stores the program code and/or data to be secured may be implemented as a single integrated circuit on one substrate, this approach may incur a significant cost penalty, especially for serial flash memories where cost is a factor. Serial flash memories typically are offered in many different densities. Providing a security feature on different densities of serial flash memory involves designing the security functionality into each one of the densities of serial flash memory. Moreover, if either the security engine or the memory becomes outdated or is found to be flawed, the entire inventory of memory integrated circuit chips and masks may have to be discarded and a new memory integrated circuit design would be required.

Figure 1:
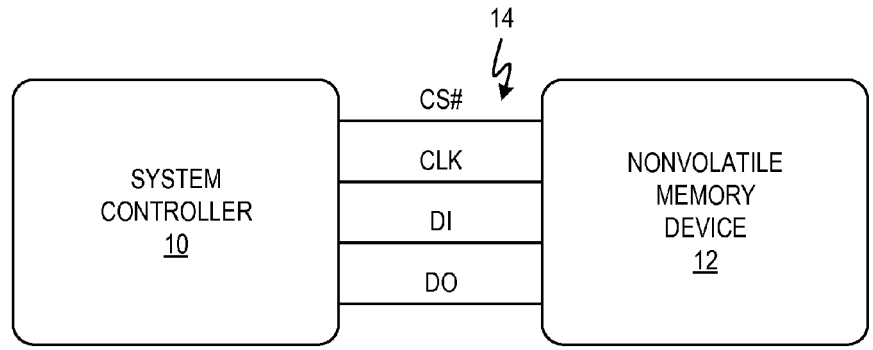
FIG. 1 is a schematic block diagram of an untrusted memory subsystem.
Figure 2:
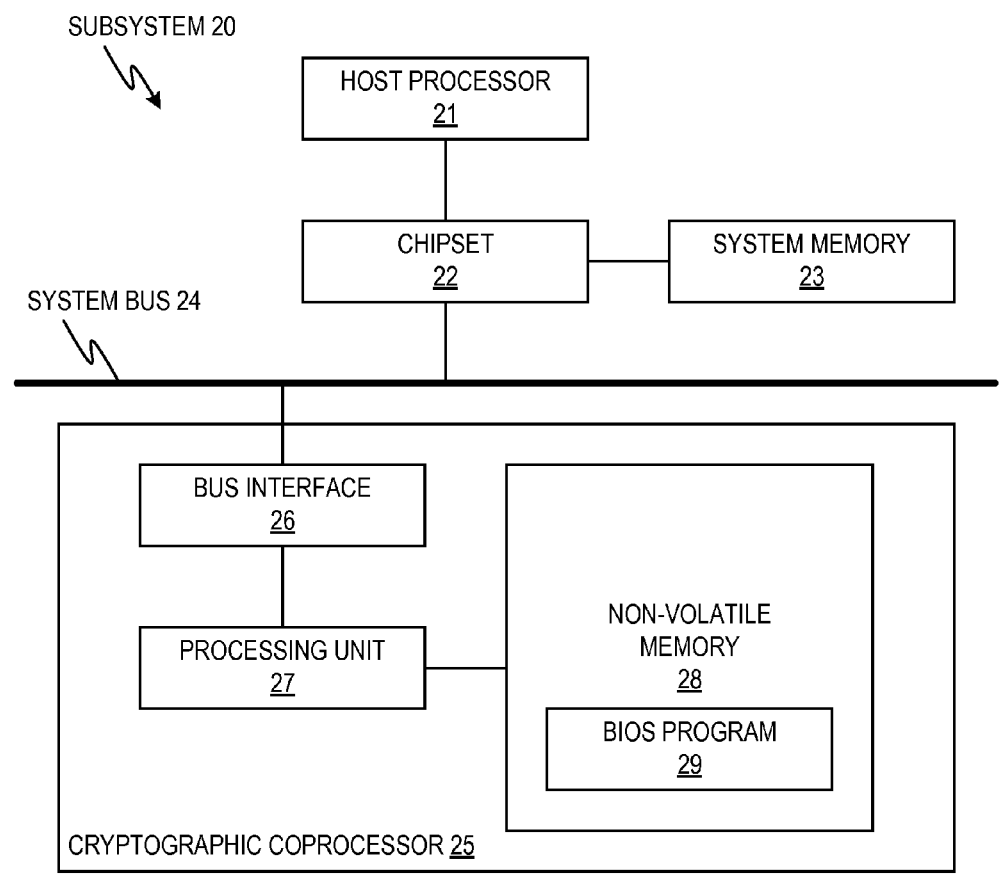
FIG. 2 is a schematic block diagram of a trusted nonvolatile memory subsystem for the BIOS of a computer.
Figure 3:
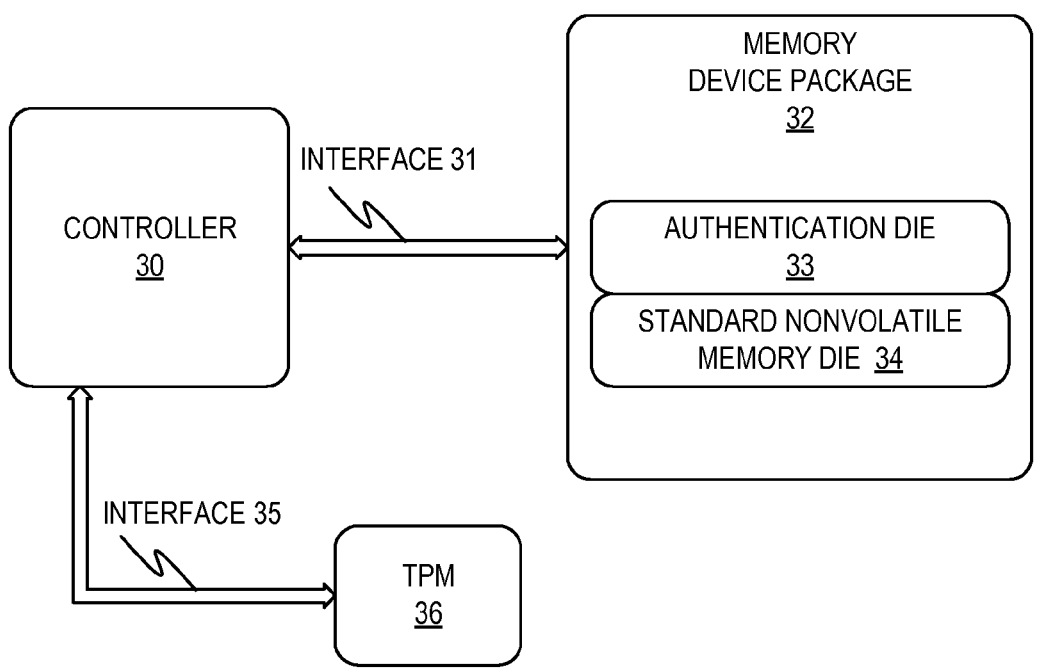
FIG. 3 is a schematic block diagram of a trusted nonvolatile memory device and controller.

FIG. 3 shows an approach in which a memory device package 32 encloses two separate die, one being a standard nonvolatile memory integrated circuit die 34, and the other being any suitable authentication integrated circuit die 33. Either die 33 or 34 may be stacked upon the other. Alternatively, the die 33 and 34 may be placed side-by-side, which reduces the height of the memory device package 32 but increases the footprint. The external contacts (not shown) of the device package 32 may correspond to the power and signal requirements of the standard nonvolatile memory integrated circuit die 34 so that the pin-out of the memory device package 32 may present the standard pinout for the type of memory product for which the standard nonvolatile memory integrated circuit die 34 is normally used. The power and signal requirements of the authentication integrated circuit die 33 may be satisfied with some or all of the pins for the nonvolatile memory integrated circuit die 34, or with other unused pins of the memory device package 32. One or more additional external contacts may be added exclusively for the authentication integrated circuit die 33, but where the number of contacts required for the authentication integrated circuit die 33 is less than or equal to the number of contacts required for the standard nonvolatile memory integrated circuit die 34, satisfying the requirements of the authentication integrated circuit die 33 by using the signal and power lines for the standard nonvolatile memory integrated circuit die 34 allows the external pinout to be standard for enhanced compatibility. In some implementations, one or more signals may be dedicated as between the standard nonvolatile memory integrated circuit die 34 and the authentication integrated circuit die 33, but these inter-die signals need not be available to any of the external contacts.

The standard nonvolatile memory integrated circuit die 34 may be any type of nonvolatile memory such as, for example, NOR flash, NAND flash, EEPROM, PCRAM, FRAM, RRAM, MRAM and so forth, having any type of suitable interface, including parallel interfaces such as the parallel flash bus interface and the NAND bus interface, serial interfaces such as the Serial Peripheral Interface ("SPI") and the Quad Peripheral Interface ("QPI"), and so forth. The authentication integrated circuit die 33 may be implemented with its own volatile memory and nonvolatile memory for key storage, and may include any desired circuits and programming for implementing any desired security algorithm, whether symmetric-key or public-key cryptography, including, for example, the RSA algorithm, the Advanced Encryption Standard ("AES") specification, the Security Hash Algorithm ("SHA"), Message Authentication Codes ("MAC"), the Data Encryption Standard ("DES") specification, random number generation, monotonic counters, or any other encrypt algorithm to implement an authentication procedure with a controller 30 over an interface 31. A trusted platform module ("TPM") 36 may be provided if desired, which may communicate with the controller 30 over a suitable interface 35 such as the Low Pin Count ("LPC") interface, the I²C interface, or the SPI interface. In some implementations, sufficient security may be provided by the authentication integrated circuit die 33, so that the TPM 36 and interface 35 may be omitted, and the root key or keys may be established in the authentication integrated circuit die 33 at time of manufacture or by the original equipment manufacturer ("OEM") in a one-time programming procedure. Elimination of the TPM 36 and interface 35 simplifies the interface signals and may provide significant cost savings in some implementations. Multiple nonvolatile root keys and nonvolatile monotonic counters may also be implemented for multiple authentication procedures, if desired.

The memory device package 32 may be any desired type of integrated circuit package, including, for example, Small Outline Integrated Circuit ("SOIC"), Very Small-Outline Package ("VSOP"), Plastic Dual In-Line Package ("PDIP"), Very Very Thin Small Outline No Lead ("WSON"), and Thermally Enhanced Ball Grid Array ("TFBGA"). Suitable package types also include the 150 mil 8-pin SOIC package for low density parts, the 208 mil 8-pin SOIC package for medium to high density parts, and the low profile 6 mm×5 mm 8-pad WSON package. Any type of interface matching the interface of the standard nonvolatile memory integrated circuit die 34 may be used, including single and multiple bit SPI, QPI, conventional NAND flash memory device interface, and serial NAND flash memory interface. Commands applied over the interface 31 may be received by both the authentication integrated circuit die 33 and the standard nonvolatile memory integrated circuit die 34. While some commands may be common to both die 33 and 34, commands specific to the standard nonvolatile memory integrated circuit die 34 may be ignored by the authentication integrated circuit die 33, while commands specific to the authentication integrated circuit die 33 may be ignored by the standard nonvolatile memory integrated circuit die 34.

Advantageously, the implementation of FIG. 3 offers fast "time-to-market" and achieves "cost-savings" since the authentication integrated circuit has to be designed and put in to silicon only once, whereas suppliers providing a single integrated circuit solution have to spend the effort and time to design different densities of memory along with the security blocks every time they need a different density of memory—a new die for each density of memory. In particular, for the implementation of FIG. 3 a single authentication integrated circuit may be designed for use with any density of standard nonvolatile memory available in production, and replicated using one appropriate mask and one process as many times as desired into individual dies, each of which may be packaged along with any standard nonvolatile memory integrated circuit die to offer a variety of secure memory solutions of different densities. Moreover, a variety of different authentication integrated circuits may be designed for use with any density of standard nonvolatile memory available in production, to offer a variety of packaged memory devices of different density and different security algorithms. Additionally, multiple authentication integrated circuit dies implementing different cryptographic algorithms may be packaged with a particular standard memory integrated circuit die to offer a single packaged memory offering multiple security solutions. Moreover, any custom security engine may be designed at any time for use with any standard nonvolatile memory, without the need to modify the standard nonvolatile memory. In all cases, the standard nonvolatile memory integrated circuit die may be used without modification, so that no additional cost is incurred for modifying the memory design and retooling for production. Moreover, the user is benefitted by having a security nonvolatile memory device in one convenient and familiar package with a familiar and convenient pinout.

Figure 4:
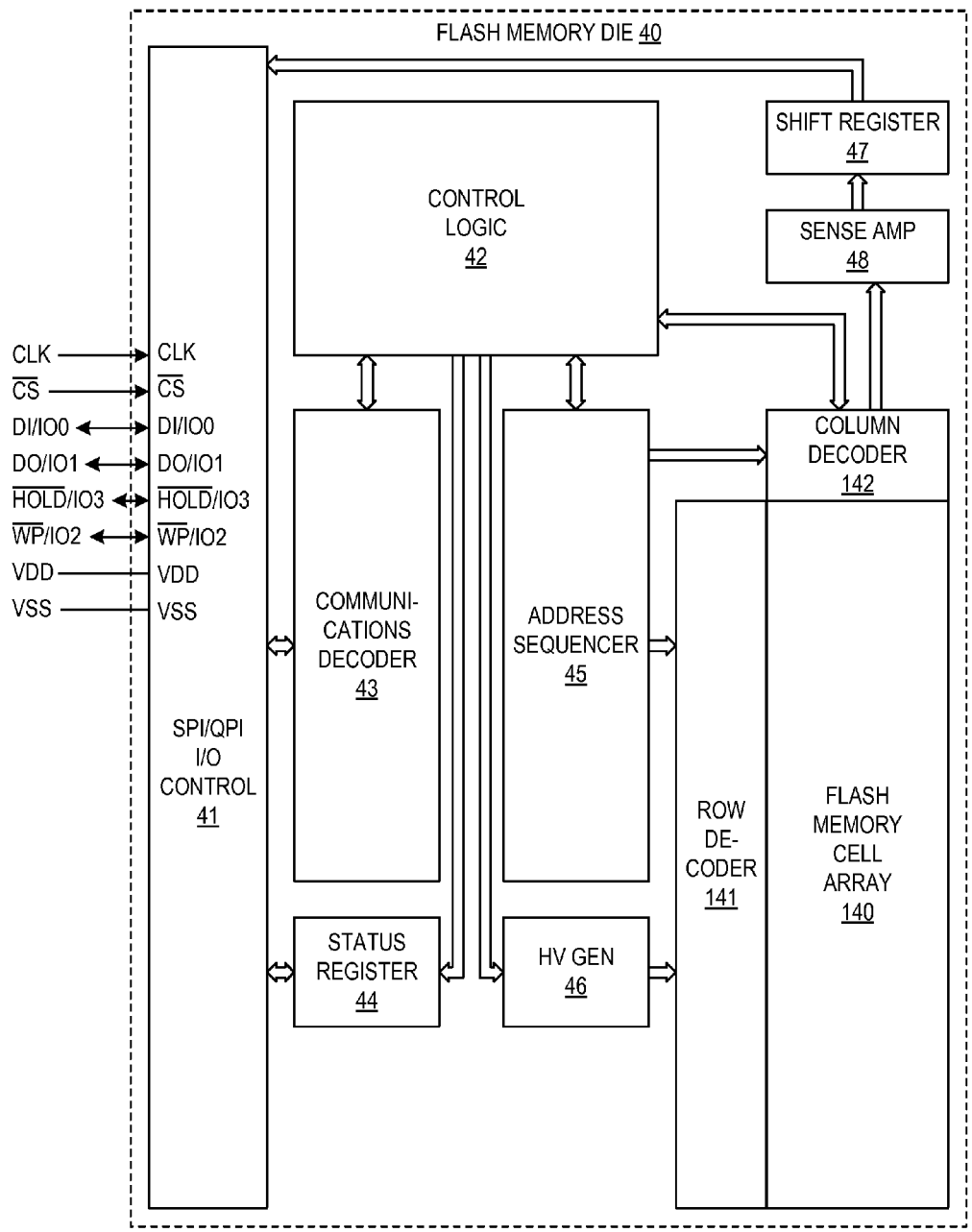
FIG. 4 is a schematic block diagram of a flash memory integrated circuit die suitable for the trusted nonvolatile memory device of FIG. 3.

FIG. 4 shows an illustrative serial flash memory integrated circuit die 40, which is one type of nonvolatile memory integrated circuit die suitable for the implementation of FIG. 3. The flash memory integrated circuit die 40 includes a flash memory cell array 140 of any desired architecture, including NOR and NAND types. Any desired flash memory cell technology may be used. The flash array 140 includes word (row) lines and bit (column) lines, as well as various other circuits to support memory programming, erase and read, such as row decoder 141, column decoder 142, control logic 42, communications decoder 43, status register 44, address sequencer 45, high voltage generators 46, shift register 47, and sense amplifier 48.

While any desired communications interface may be used, a particularly suitable interface is the SPI/QPI interface which provides single bit, two bit, and four bit SPI as well as the Quad Peripheral Interface ("QPI"). Additional detail on the SPI and QPI interfaces and on the circuits related to the memory arrays may be found in U.S. Pat. No. 7,558,900 issued Jul. 7, 2009 to Jigour et al., and in a publication by Winbond Electronics Corporation, Datasheet: SPIFLASH (®) W25Q128FV3V 128M-Bit Serial Flash Memory with Dual/Quad SPI & QPI, Revision D, Oct. 1, 2012, which hereby are incorporated herein in their entirety by reference thereto. The illustrative SPI/QPI I/O control 41 implements SPI/QPI interface using signal CLK for the clock signal, signal /CS for the chip select complement signal, signal DI or IO0 for serial data-in (single bit SPI) and bit 0 serial data-in/out (multi-bit SPI and QPI), signal DO or IO1 for serial data-out (single bit SPI) and bit 1 serial data-in/out (multi-bit SPI and QPI), signal /WP or IO2 for the write protect complement signal (single bit SPI) and bit 2 serial data-in/out (multi-bit SPI and QPI), signal /HOLD or IO3 for the hold complement signal (single bit SPI) and bit 3 serial data-in/out (multi-bit SPI and QPI), power VDD, and power VSS.

The command set used by the controller 30 for the untrusted memory functions may be the standard command set specified for the standard nonvolatile memory integrated circuit die 34.

Figure 5:
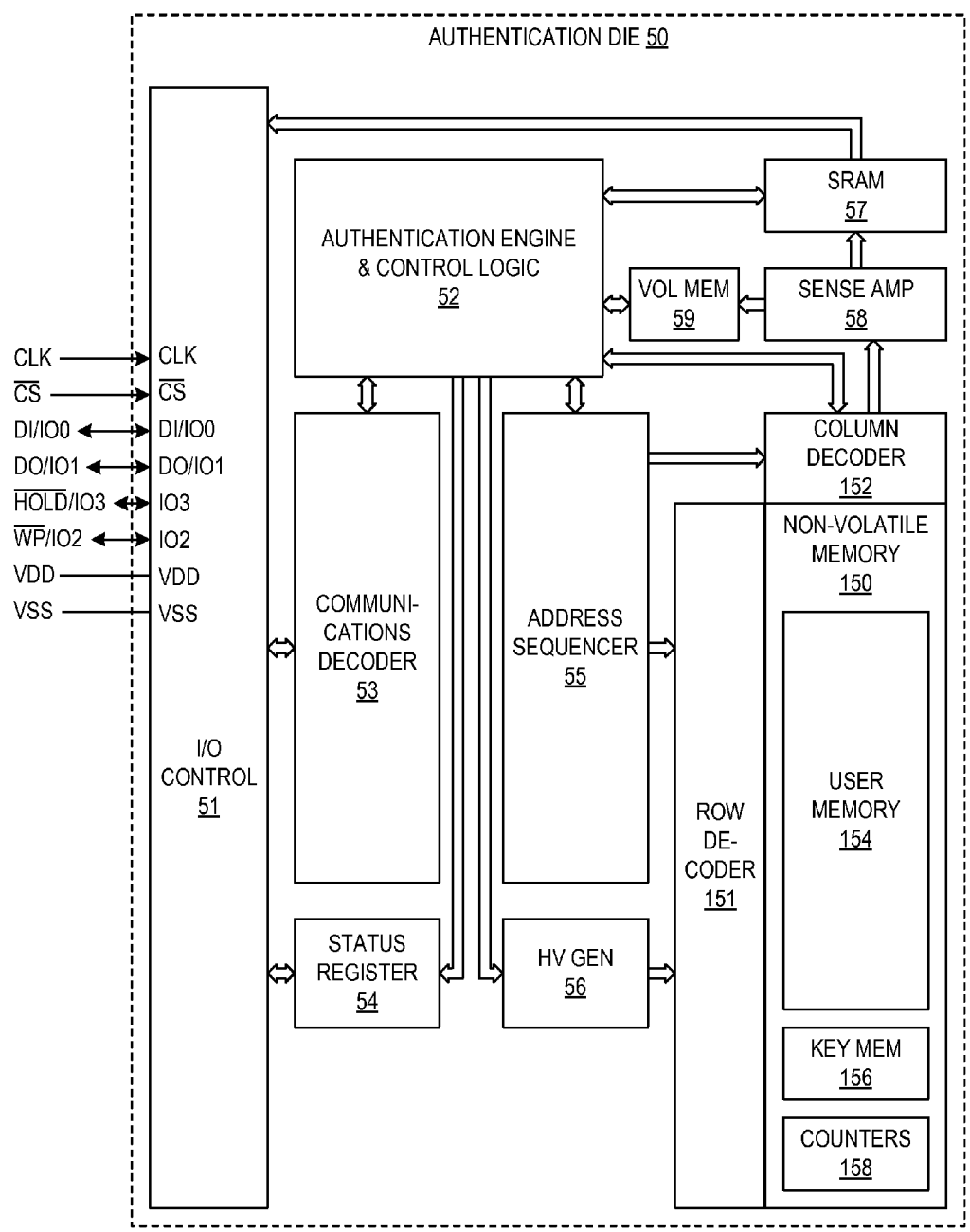
FIG. 5 is a schematic block diagram of an authentication integrated circuit die suitable for the trusted nonvolatile memory device of FIG. 3.

FIG. 5 shows an illustrative authentication integrated circuit die 50, which includes a nonvolatile memory cell array 150 of any desired architecture using any desired type of nonvolatile memory cell technology. The array 150 includes word (row) lines and bit (column) lines, as well as various other circuits to support memory programming, erase and read, such as row decoder 151, column decoder 152, authentication engine and control logic 52, communications decoder 53, status register 54, address sequencer 55, high voltage generators 56, SRAM 57, sense amplifier 58, and volatile memory 59. The nonvolatile memory cell array 150 provides trusted nonvolatile storage for sensitive information such as root security keys and monotonic counter values. A portion of the nonvolatile memory 150 may be made one-time programmable or read-only (as, for example, Read Only Memory or "ROM") for storage of the root security key. The volatile memory 59 provides temporary storage for keys derived from the root key. An I/O control 51 interfaces with the SPI/QPI signal and power lines. Illustratively the authentication integrated circuit die 50 may operate in any of the SPI modes or the QPI mode, and therefore uses the CLK, /CS, DI/IO0, DO/IO1, IO2 and IO3 signal lines as well as the VDD and VSS power lines. Signals /WP and /HOLD need not be used. Illustratively, the authentication integrated circuit die (not shown) may operate only in the single-bit SPI mode, and therefore uses the CLK, /CS, DI and DO as well as the VDD and VSS power lines. Moreover, signals /WP and /HOLD need not be used so that only six pins may be used.

The command set used by the controller 30 for authentication and for the trusted memory functions may be a set of commands specific for the authentication integrated circuit die 33, except that some commands may be used for authentication and trusted memory functions as well as untrusted memory functions.

Figure 6:
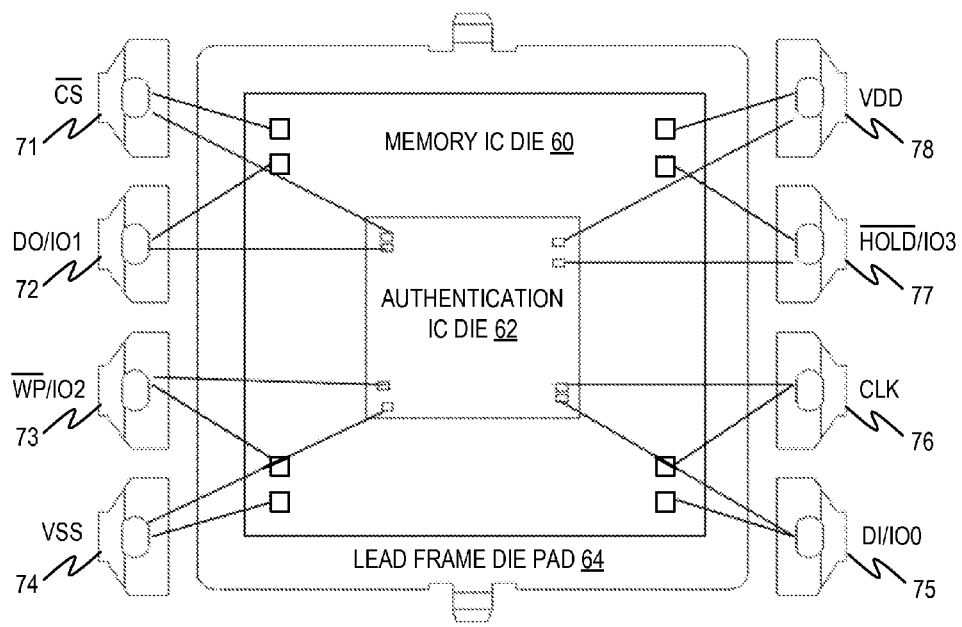
FIG. 6 is a top plan view of a bonding diagram for a flash memory device containing an authentication integrated circuit die mounted on a serial flash die and bonded to external contacts.
Figure 7:
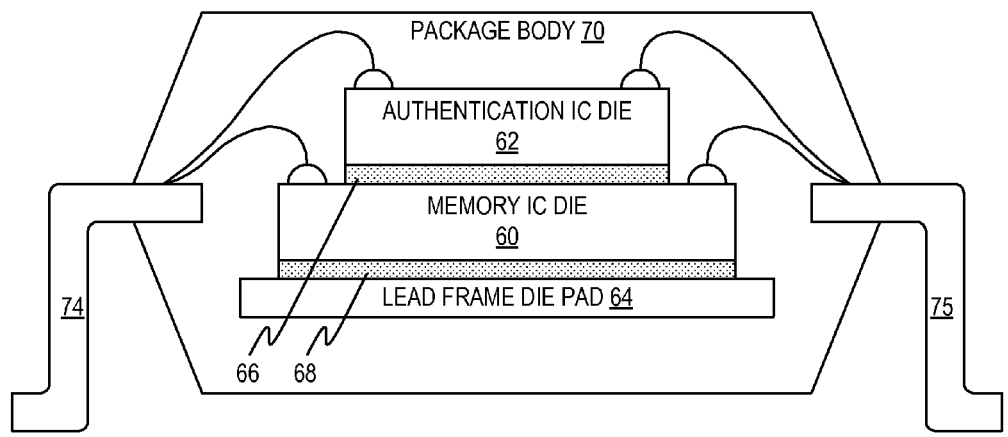
FIG. 7 is a side plan view of the packaged flash memory device of FIG. 6.
Figure 9:
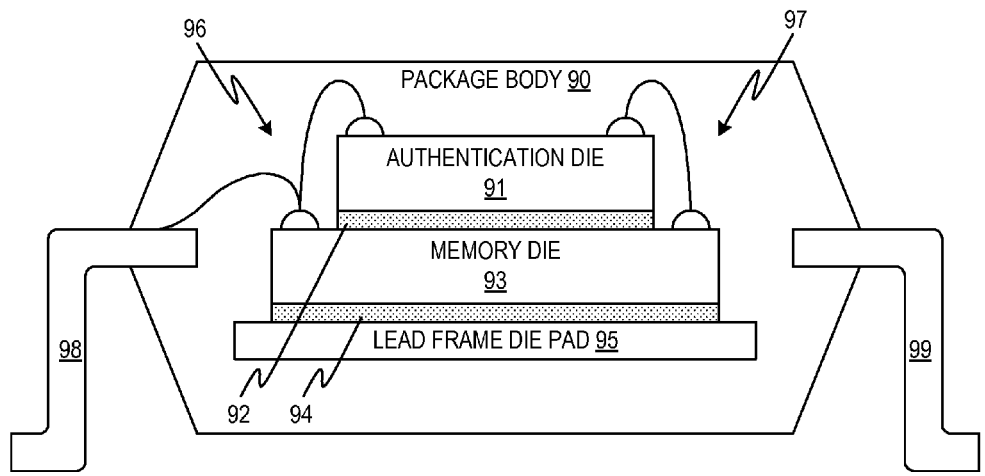
FIG. 9 is a side plan view of a packaged flash memory device showing different types of connections.

FIG. 6 and FIG. 7 show various views of a bonding diagram for an illustrative nonvolatile memory device. FIG. 6 shows a top plan view from which encasing plastic has not been shown for clarity, and FIG. 7 shows a side plan view along a pair of opposing pins 74 and 75, the pins being just one type of external contact commonly used in integrated circuit packages. The package type illustratively is an 8-pin SOIL type package. A memory integrated circuit die 60 is bonded to a lead frame die pad 64 or other type of support structure using any suitable bonding agent 68, illustratively a gold-tin or gold-silicon solder or epoxy adhesive. A smaller authentication integrated circuit die 62 is bonded to the top of the memory integrated circuit die 60 using any suitable bonding agent 66, illustratively a gold-tin or gold-silicon solder or epoxy adhesive. This arrangement may also be referred to as a die-on-die technique. Although the memory integrated circuit die 60 is larger than the authentication integrated circuit die 62, the relative sizes may be reversed so that a memory integrated circuit die may be mounted on a relatively larger authentication integrated circuit die (not shown). Illustratively, the memory integrated circuit die 60 has an SPI/QPI flash memory interface, so that the pins 71-78 of the packaged nonvolatile memory device are respectively designated /CS, DO or IO1, /WP or IO2, VSS, DI or IO0, CLK, /HOLD or IO3, and VDD, and respective wires connect the eight bonding pads on the memory integrated circuit die 60 to these pins. Similarly, respective bond wires connect the eight bonding pads on the authentication integrated circuit die 62 to these pins. Alternatively, bond wires may be used to connect the eight bonding pads on the memory integrated circuit die 60 and the eight bonding pads on the authentication integrated circuit die 62 respectively to one another, and other wire bonds may be used to connect the respective connected bonding pad pairs to the pins (see, for example, wiring arrangement 96 in FIG. 9). A plastic body 70 is injection molded so as to encase the memory integrated circuit die 60, the authentication integrated circuit die 62, the lead wires, and portions of the pins (e.g. 74 and 75 as shown in FIG. 7) to protect and stabilize these parts.

If more pins are needed, a larger package type may be used. It may be desired, for example, to include a RESET signal for both the memory integrated circuit die 60 and the authentication integrated circuit die 62, in which case a 16-pin SOIC type package may be used. The pinout may, for example, be standard for a SPI/QPI serial memory except that one of the otherwise unused pins may be designated for the RESET signal.

The packaging technique shown in FIG. 6 and FIG. 7 is illustrative, and other system-in-package or three dimensional integrated circuit and multi-chip packaging ("MCP") techniques may be used as desired. For very thin package bodies, a side-by-side arrangement of the memory integrated circuit die 60 and the authentication integrated circuit die 62 on a lead frame die pad may be more suitable. In this type of implementation, it may be desirable to fabricate the authentication integrated circuit die 62 with additional traces and bonding pads so that the distance of various wire bonds may be kept short. Moreover, while the use of a suitable bonding agent to stack the memory integrated circuit die 60 and the authentication integrated circuit die 62 may be quite effective, other stacking techniques may be used, such as, for example, attaching the respective die to the top and bottom of a substrate. Similarly, a substrate may be used to support the die in side-by-side arrangements. Many other techniques are available for electrically connecting the bonding pads or other contacts on the memory integrated circuit die 60 and the authentication integrated circuit die 62 to one another and to the pins or contacts on the external of the package, including solder bumps.

Figure 8:
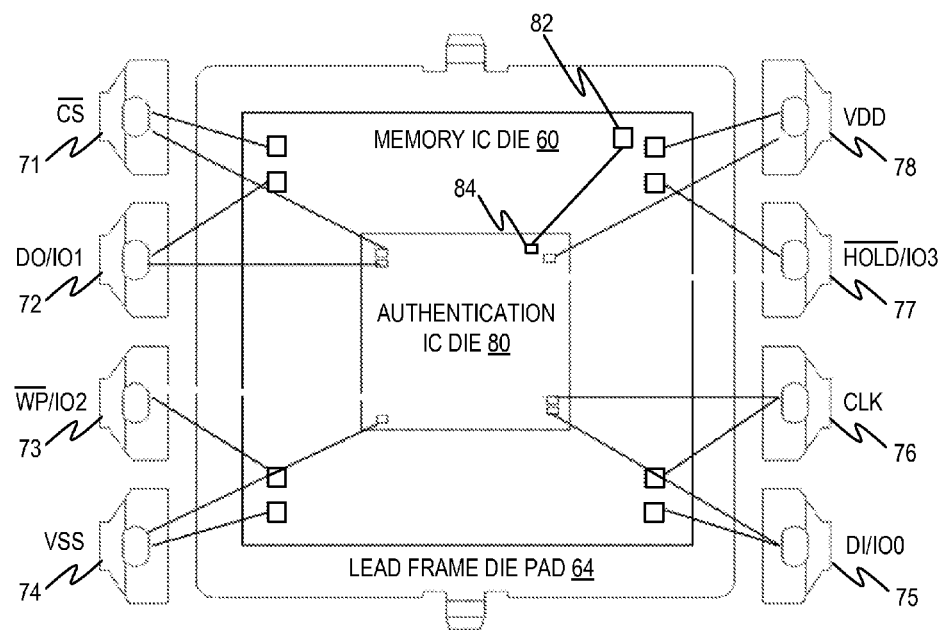
FIG. 8 is a top plan view of a bonding diagram for another flash memory device containing an authentication integrated circuit die mounted on a serial flash die and bonded to external contacts.

The packaging arrangement shown in FIG. 8 is similar to the packaging arrangement shown in FIG. 6, except that the authentication integrated circuit die 80 is designed to operate only in the single bit SPI mode so that signal lines IO2 and IO3 are not used. Since /WP and /HOLD also are not used, the bonding pads and wiring used in FIG. 6 for connecting to IO2 and IO3 may be eliminated. FIG. 8 also shows an example of an internal die-to-die connection using a wire between bonding pad 82 on the memory integrated circuit die 60 and bonding pad 84 on the authentication integrated circuit die 80. An example of this internal die-to-die wiring is shown by wiring arrangement 97 in FIG. 9.

Figure 10:
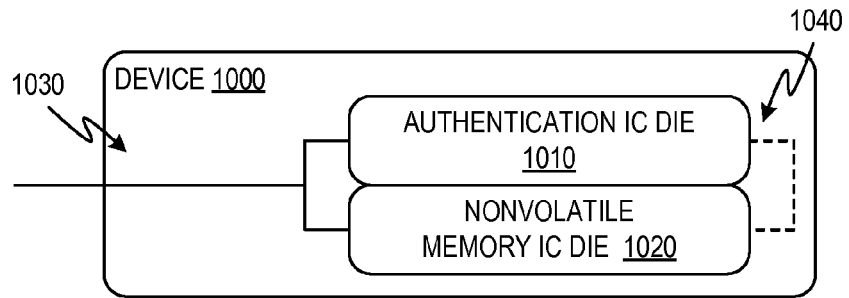
FIG. 10 is a block diagram showing an illustrative set of interconnections between an authentication integrated circuit die and a nonvolatile memory integrated circuit die of a memory device, and to external pins of the device.

FIG. 10 through FIG. 13 show various arrangements of external signal and power connections and internal signal connections. FIG. 10 shows a memory device 1000 having an authentication integrated circuit die 1010 and a memory integrated circuit die 1020 which share a common interface 1030. One or more internal connections 1040 may be provided if desired.

Figure 11:
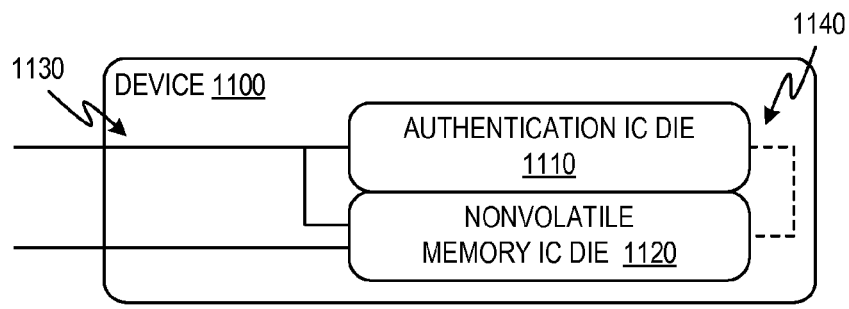
FIG. 11 is a block diagram showing another illustrative set of interconnections between an authentication integrated circuit die and a nonvolatile memory integrated circuit die of a memory device, and to external pins of the device.

FIG. 11 shows a memory device 1100 in which an authentication integrated circuit die 1110 shares a subset of the signal and/or power lines of a memory integrated circuit die 1120, which has unshared external signal and/or power connections (interface 1130). One or more internal connections 1140 may be provided if desired.

Figure 12:
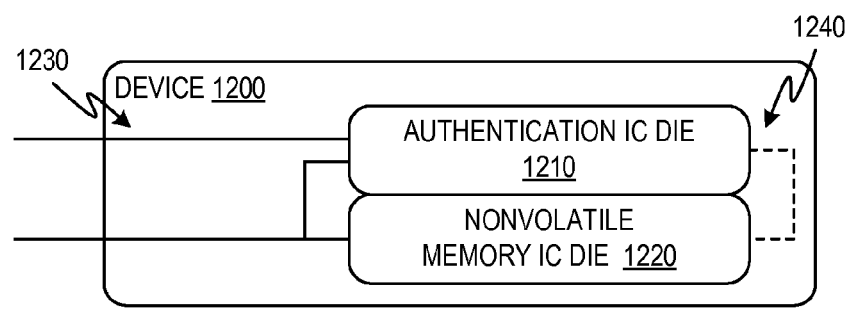
FIG. 12 is a block diagram showing another illustrative set of interconnections between an authentication integrated circuit die and a nonvolatile memory integrated circuit die of a memory device, and to external pins of the device.

FIG. 12 shows a memory device 1200 in which a memory integrated circuit die 1220 shares a subset of the signal and/or power lines of an authentication integrated circuit die 1210, which has unshared external signal and/or power connections (interface 1230). One or more internal connections 1240 may be provided if desired.

Figure 13:
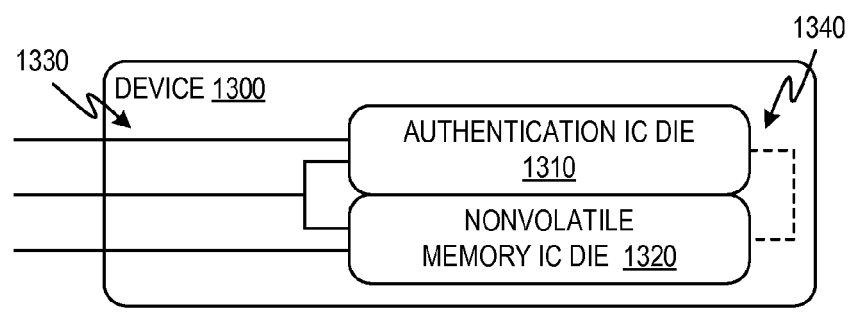
FIG. 13 is a block diagram showing another illustrative set of interconnections between an authentication integrated circuit die and a nonvolatile memory integrated circuit die of a memory device, and to external pins of the device.

FIG. 13 shows a memory device 1300 in which an authentication integrated circuit die 1310 shares a subset of the signal and/or power lines of a memory integrated circuit die 1320. Both the authentication integrated circuit die 1310 and the memory integrated circuit die 1320 have unshared external signal and/or power connections (interface 1330). One or more internal connections 1340 may be provided if desired.

Figure 14:
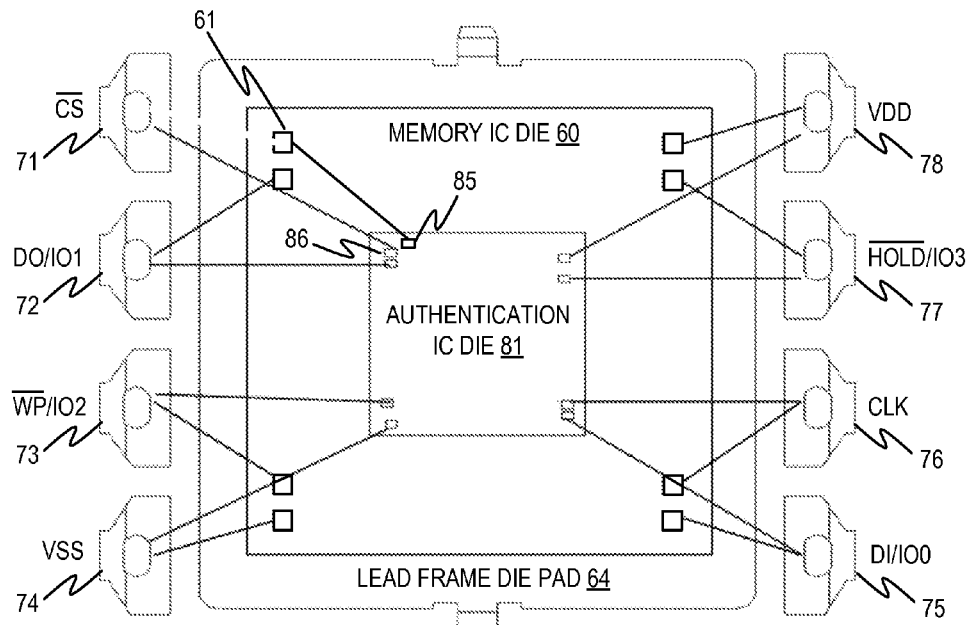
FIG. 14 is a top plan view of a bonding diagram for another flash memory device containing an authentication integrated circuit die mounted on a serial flash die, and including wire bonds for external contacts and internal die-to-die contacts.
Figure 15:
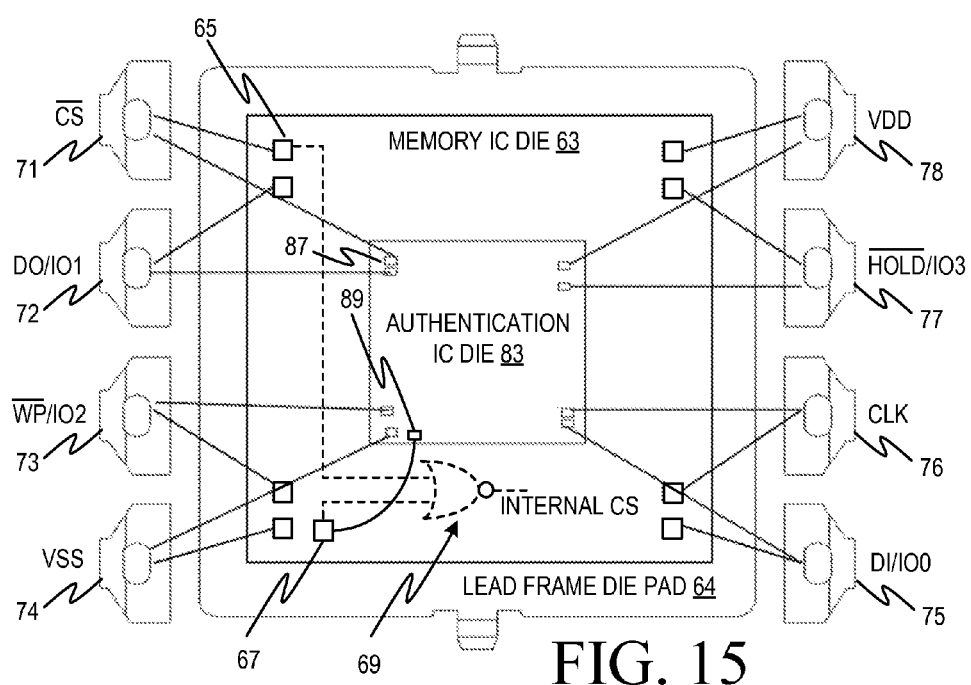
FIG. 15 is a top plan view of a bonding diagram for another flash memory device containing an authentication integrated circuit die mounted on a serial flash die, and including wire bonds for external contacts and internal die-to-die contacts.

FIG. 14 and FIG. 15 show alternative examples of internal die-to-die connections for controlling application of /CS to a memory integrated circuit die based on the results of authentication.

The packaging arrangement shown in FIG. 14 is similar to the packaging arrangement shown in FIG. 6, except that authentication integrated circuit die 81 is designed to control the application of /CS to the memory integrated circuit die 60, the wire between pin 71 and bonding pad 61 of the memory integrated circuit die 60 is eliminated, and an internal die-to-die connection is made between bonding pad 85 on the authentication integrated circuit die 81 and bonding pad 61 of the memory integrated circuit die 60. The /CS signal is provided to the authentication integrated circuit die 81 from the pin 71 to bonding pad 86. In the event of an authentication pass, the /CS signal is passed along to the bonding pad 61, while in the event of an authentication fail, the /CS signal is not passed along to the bonding pad 61.

The packaging arrangement shown in FIG. 15 is similar to the packaging arrangement shown in FIG. 6, except that authentication integrated circuit die 83 is designed to generate an internal authentication pass/fail signal to control the application of /CS to the memory integrated circuit die 63, the memory integrated circuit die 63 is designed to include a gating circuit 69, illustratively shown as a NOR gate, and an internal die-to-die connection is made between bonding pad 89 on the authentication integrated circuit die 83 and bonding pad 67 of the memory integrated circuit die 63 to apply the internal authentication pass/fail signal. The /CS signal is provided from the pin 71 both to bonding pad 87 on the authentication integrated circuit die 83, and to bonding pad 65 on the memory integrated circuit die 63. In the event of an authentication pass, the internal authentication pass/fail signal is made "low" so that the gating circuit 69 passes /CS. In the event of an authentication fail, the internal authentication pass/fail signal is made "high" so that the gating circuit 69 does not pass /CS.

The packaging arrangement of FIG. 15 is advantageous in situations where the timing of /CS is in the critical path, since the application of /CS to a memory integrated circuit die is not delayed as it may be in the packaging arrangement of FIG. 14. Although the memory integrated circuit die 63 is designed to include the gating circuit 69, the memory integrated circuit die 63 may nonetheless be considered to be a standard memory integrated circuit die since it may be used with or without an authentication integrated circuit die. When used without an authentication integrated circuit die (not shown), the bonding pad 67 may be wired to VSS pin 74 or to any bonding pad wired to pin 74, so that the gating circuit 69 passes /CS.

Implementation Examples

Figure 16:
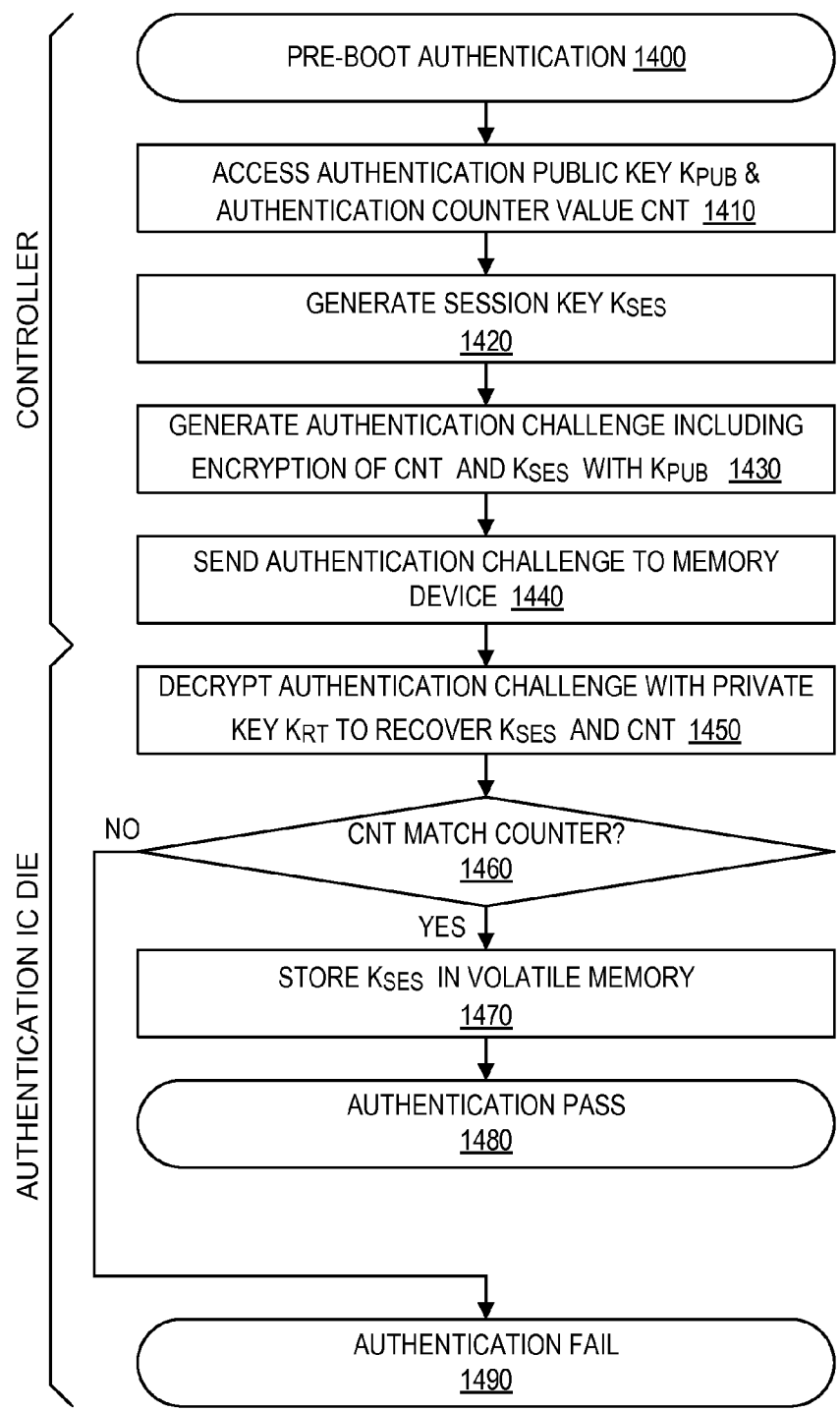
FIG. 16 is a flowchart of a pre-boot authentication process.

FIG. 16 through FIG. 19 show illustrative authentication processes that may be carried out by the authentication integrated circuit die 50 (FIG. 5) in combination with the flash memory integrated circuit die 40 when used for BIOS storage. The communications decoder may be responsive to specialized authentication-specific commands such as a Counter Read command for reading the values of the monotonic counters (FIG. 17), and also may be responsive to some standard memory commands such as erase/program commands for incrementing a memory-modified monotonic counter to detect replay attacks (FIG. 16). The non-volatile memory 150 may include several distinct regions such as, for example, user memory 154, an information region (not shown), configuration memory (not shown), key memory 156, and counters 158. The user memory 154 may have several zones that may be configured to offer a variety of different access restrictions ranging from open access to full restrictions that preclude read/write operations and will only permit internal, authenticated use for such data as security keys. The information region holds read-only information such as chip identification information. The configuration memory provides for personalization of resources of the authentication integrated circuit die, including for example, counters and key usage, and includes the ability to lock the memory to render the configurations permanent. The key memory region 156 is a one-time program ("OTP") area that stores one or more secret keys such as root keys, and is not user-accessible. The counters region 158 stores values of the nonreversible monotonic counters. The authentication techniques described herein are merely illustrative, and a great many authentication techniques known in the art are suitable for implementation in the authentication integrated circuit die.

The configuration of the nonvolatile memory 150 as described herein is merely illustrative. Some authentication and encryption implementations may use only a root key and monotonic counters, in which event the nonvolatile memory 150 may be configured with only a key memory and monotonic counter memory.

The memory device containing the authentication integrated circuit die and the nonvolatile memory integrated circuit die may be manufactured in a default state in which the authentication integrated circuit die is not initiated. Either the manufacturer may initialize the authentication integrated circuit die, or the manufacturer may ship the authentication integrated circuit die in an uninitialized state so that the recipient, typically an Original Equipment Manufacturer ("OEM"), may initialize it. Initialization is a one-time programming process in which a root key $K_{RT}$ is written to the key memory region 156 and the monotonic counters are initialized. After initialization, if the root key $K_{RT}$ is to serve as a private key, a public key $K_{PUB}$ may be generated and stored in user memory 154. The memory device is now ready for use.

FIG. 16 shows a pre-boot authentication process 1400. The memory controller or other processor is presumed to know the value CNT of the authentication monotonic counter from the immediately-prior session, as well as the public key $K_{PUB}$ corresponding to the root key $K_{RT}$ of the memory device (block 1410). The public key $K_{PUB}$ may be read from the memory device, obtained from a certification agency, or acquired in any other suitable manner. The controller then generates a session key $K_{SES}$ in any suitable manner, illustratively by using a random number generator (block 1420), generates an authentication challenge including encryption of counter CNT and session key $K_{SES}$ with the public key $K_{PUB}$ (block 1430), and sends the authentication challenge to the memory device (block 1440). The authentication integrated circuit die in the memory device decrypts the authentication challenge with the private key $K_{RT}$ to recover counter CNT and session key $K_{SES}$ (block 1450). The authentication integrated circuit die then compares CNT with the value of the corresponding monotonic counter in the counters 156 (FIG. 5) (block 1460). If the counters do not match, an unauthorized erase/program of the nonvolatile memory integrated circuit die which caused the monotonic counter to increment outside of the authorized program likely occurred and the authentication fails (block 1490). If the counters match, the session key $K_{SES}$ may be stored in volatile memory 59 (FIG. 5) (block 1470) for use later in the session, and the authentication passes (block 1480).

During the authenticated session, the controller may increment the counter CNT to keep track of all authorized erase/program accesses to the memory device by the authorized program. In this way, at the end of the session the count CNT maintained by the controller should match the monotonic counter in the authentication integrated circuit die unless an unauthorized program has tampered with the memory integrated circuit die. A comparison of the two counters may be done by the controller by reading the monotonic counter in the following manner.

Figure 17:
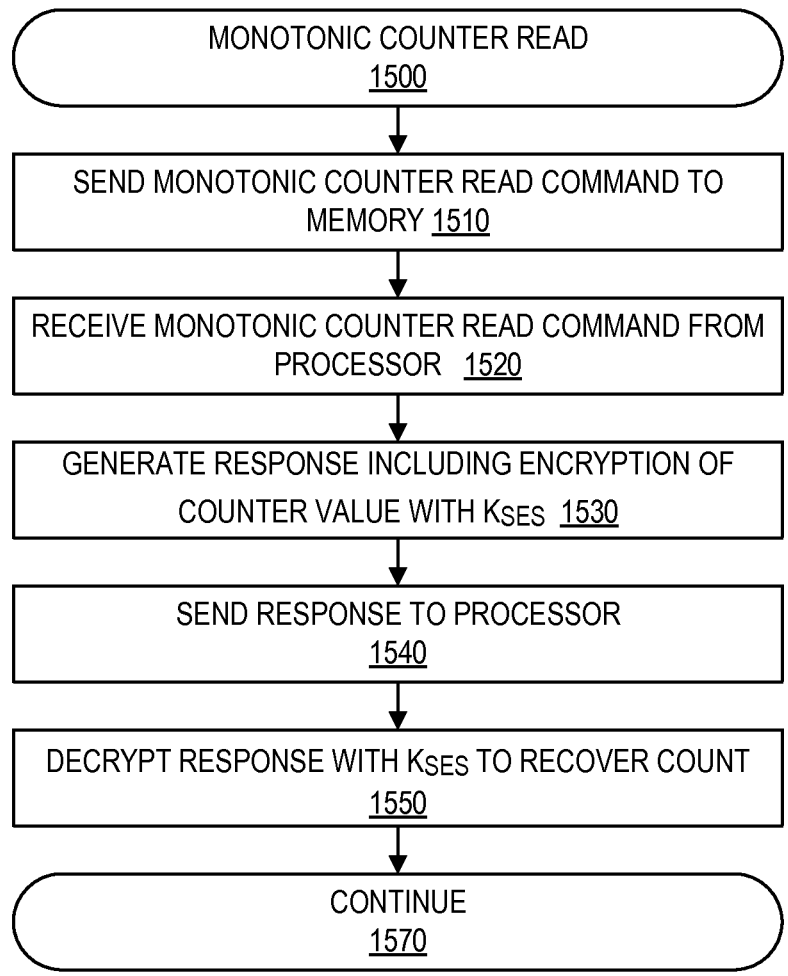
FIG. 17 is a flowchart of a monotonic counter read process.

FIG. 17 shows a monotonic counter read process using the session key for symmetrical encryption. A monotonic counter read command is sent by the controller to the memory device (block 1510). Upon receipt of the command (block 1520), the authentication integrated circuit die generates a response, which includes the counter value encrypted by the session key $K_{SES}$ (block 1530). The memory device sends the response to the controller (block 1540), which decrypts the response with the symmetrical session key $K_{SES}$ to recover the value of the monotonic counter (block 1550). The value of the monotonic counter may be used by the controller in any desired manner (block 1570), such as, for example, to compare the two counters to determine whether the memory integrated circuit die has be tampered with.

Figure 18:
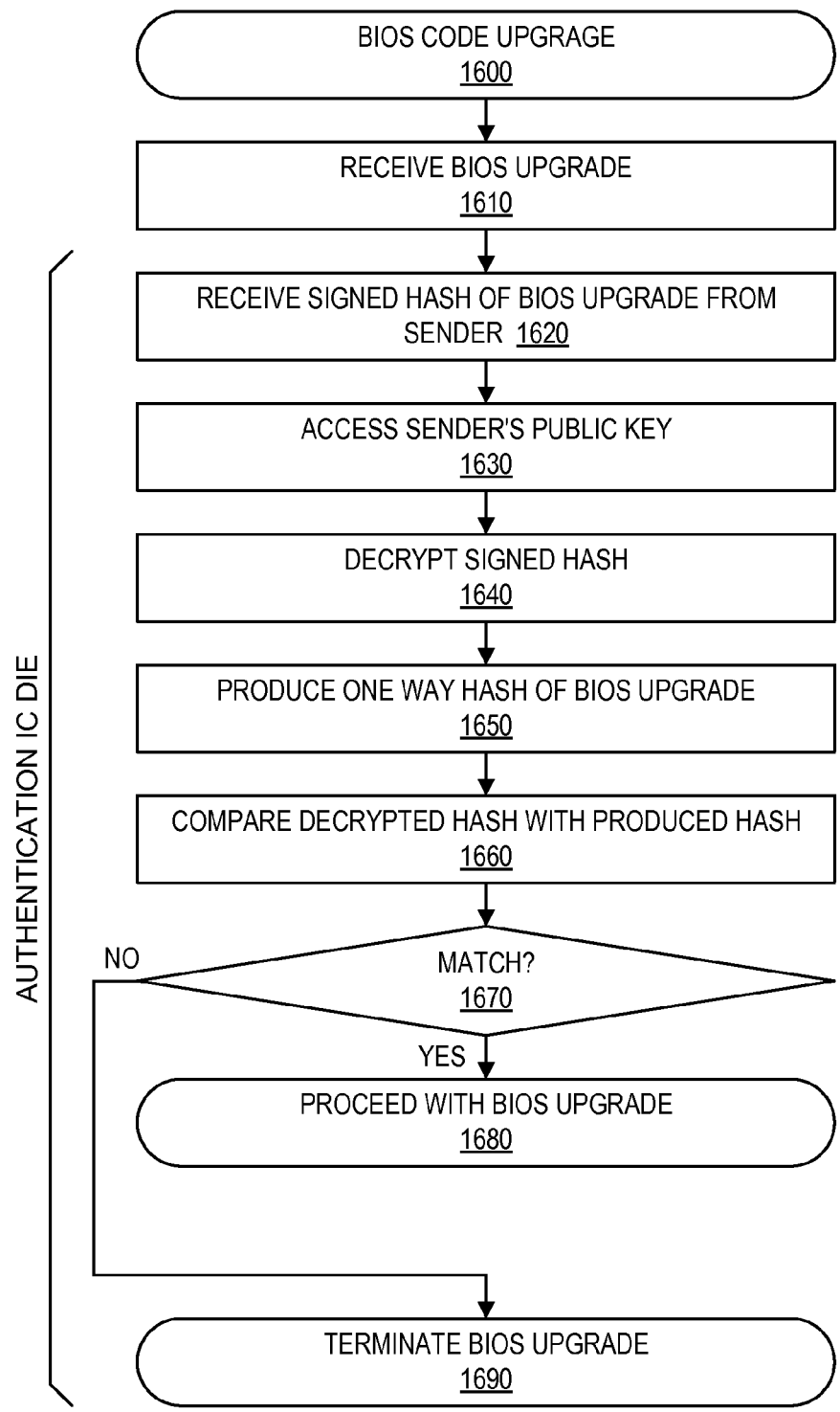
FIG. 18 is a flowchart of a BIOS code upgrade process.

FIG. 18 shows a process for authenticating a BIOS code upgrade. The BIOS upgrade is received from the sender (block 1610), along with a hash of the BIOS signed by the sender (block 1620). If not already stored in the user memory area of the authentication integration circuit die, the sender's public key is acquired in any suitable manner, such as, for example, from a certification agency, and stored in the user memory area of the authentication integration circuit die (block 1630). The authentication integration circuit die may then decrypt the signed hash (block 1640), produce a hash of the BIOS upgrade (block 1650), and compare the decrypted hash with the produced hash (block 1660). If a match occurs (block 1670 yes), the BIOS upgrade may be authorized (block 1680). If a match does not occur (block 1670 no), the BIOS upgrade is terminated (block 1690).

Figure 19:
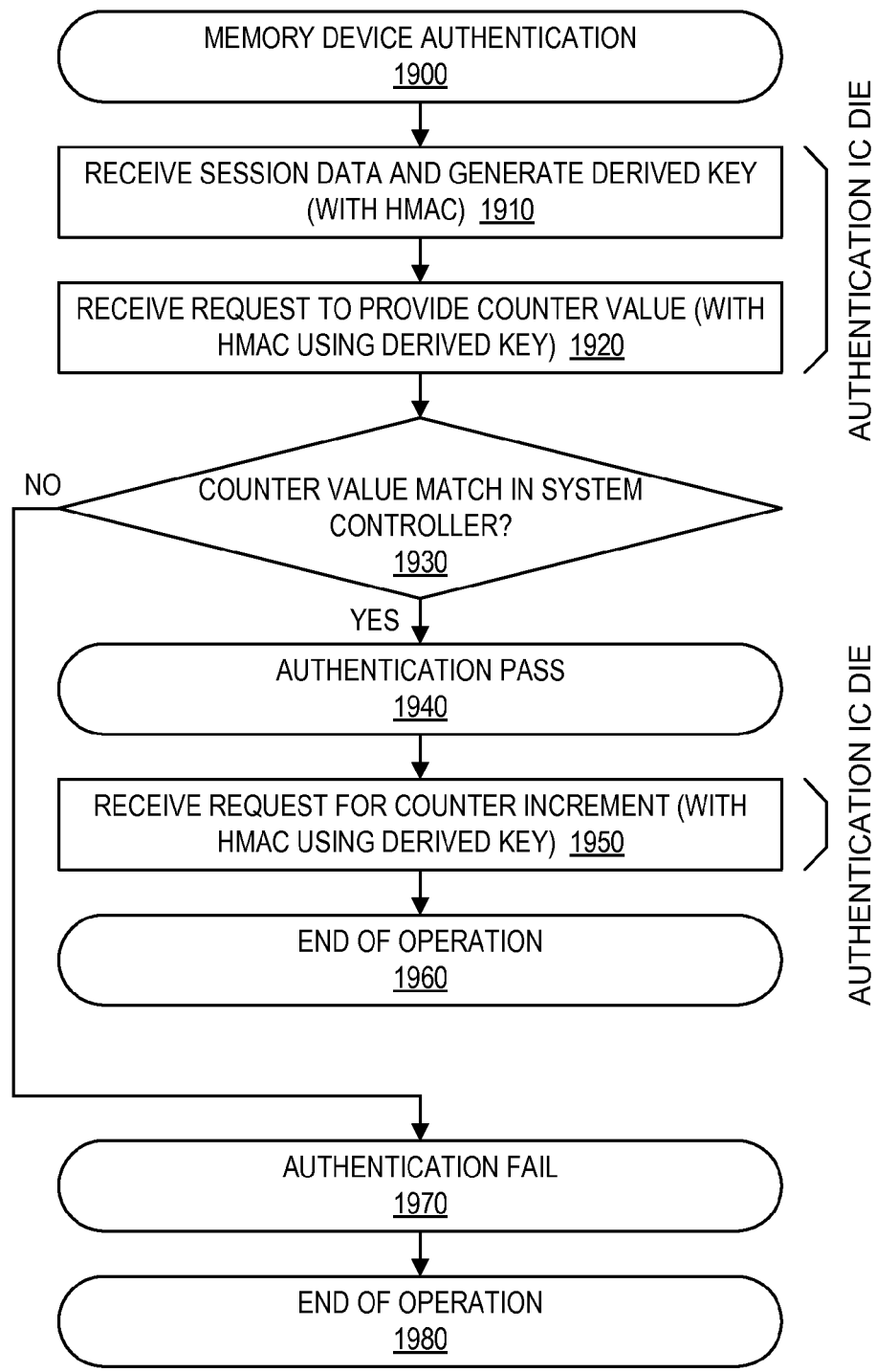
FIG. 19 is a flowchart of a memory device authentication process.

FIG. 19 shows a process 1900 for memory device authentication which is based upon secure communication between a system controller and an authentication integrated circuit die in a memory device. The process of FIG. 19 uses a keyed hash method authentication code ("HMAC"). In the process 1900, some of the requests by system controller to the authentication integrated circuit die are made with keyed-HMAC. Keyed HMAC uses a derived key, which may be based on a root key and session data, wherein the session data is generated by the system controller and the root key is stored on the authentication integrated circuit die. Illustratively, the session data may be a session key. A further description of keyed-HMAC may be found in National Institute of Standards and Technology, The Keyed-Hash Message Authentication Code (HMAC), FIPS Publication 198-1, July 2008, which hereby is incorporated herein in its entirety by reference thereto. As described in the aforementioned NIST document, MAC's based on cryptographic hash functions are known as HMAC's. MAC's are used to authenticate both the source of a message and its integrity, and HMAC's have two functionally distinct parameters, a message input and a secret key known only to the message originator and intended receiver(s). The sender uses an HMAC function to produce a value (the MAC) from the secret key and the message input. The MAC and the message are sent to the message receiver, which computes the MAC on the received message using the same key and HMAC function as was used by the sender, and compares the result computed with the received MAC. If the two values match, the source of the message and the integrity of the message is confirmed.

In the process 1900, the authentication integrated circuit die receives session data and an HMAC from the system controller, which generates the session data and computes the HMAC (block 1910). Additional security is provided due to dynamic nature of session data, since the system controller generates unique session data for each power cycle. The authentication integrated circuit die computes a derived key based upon a root key stored in key memory of the authentication integrated circuit die, and the session data (block 1910). The derived key computed in the authentication integrated circuit die is same as the derived key computed in the system controller. The authentication integrated circuit die may then receive a request to provide the value of a non-volatile monotonic counter maintained in the authentication integrated circuit die (block 1920), the request being sent from the system controller with an HMAC using the derived key. The system controller receives the counter value from the authentication integrated circuit die, and compares it with a counter value maintained in the system controller (block 1930). The authentication fails (block 1970) when there is not a match, and operation is therefore completed (block 1980). In case of a match, the authentication is passed (block 1940). The system controller may then send a request to the authentication integrated circuit die, with a keyed-HMAC, for incrementing the non-volatile monotonic counter to the next state/count, which is duly received, authenticated and executed by the authentication integrated circuit die (block 1950). The flow is subsequently completed (block 1960).

The description of the invention including its applications and advantages as set forth herein is illustrative and is not intended to limit the scope of the invention, which is set forth in the claims. Variations and modifications of the embodiments disclosed herein are possible, and practical alternatives to and equivalents of the various elements of the embodiments would be understood to those of ordinary skill in the art upon study of this patent document. Illustratively, specific values given herein may be varied, the order of steps may be changed, some steps may be repeated, and some steps may be omitted. These and other variations and modifications of the embodiments disclosed herein, including the alternatives and equivalents of the various elements of the embodiments, may be made without departing from the scope and spirit of the invention, including the invention as set forth in the following claims.

The invention claimed is:

1. A method of authenticating a nonvolatile memory integrated circuit die contained in a package body having a plurality of contacts extending from or disposed on the package body, the nonvolatile memory integrated circuit die having a first interface electrically coupled to at least some of the contacts, comprising:
   storing a root key in a nonvolatile memory array of an authentication integrated circuit die contained in the package body, the authentication integrated circuit die further comprising a second interface and an authentication engine coupled to the second interface, the nonvolatile memory array being coupled to the authentication engine and to the second interface;
   maintaining a monotonic count within the nonvolatile memory array of the authentication integrated circuit die;
   encrypting the monotonic count within the authentication engine to generate an encrypted count; and
   furnishing the encrypted count from the authentication engine to one of the contacts via the second interface, the second interface being electrically coupled to at least some of the contacts.

2. The method of claim 1 wherein the authentication integrated circuit die comprises a volatile memory register coupled to the authentication engine, further comprising storing a session key in the volatile memory register of the authentication integrated circuit die, and wherein the encrypting step comprises encrypting the count with the session key.

3. A method of authenticating a nonvolatile memory integrated circuit die contained in a package body having a plurality of contacts extending from or disposed on the package body, the nonvolatile memory integrated circuit die having a first interface electrically coupled to at least some of the contacts, comprising:
   storing a root key in a nonvolatile memory array of an authentication integrated circuit die contained in the package body, the authentication integrated circuit die further comprising a second interface, an authentication engine coupled to the second interface, and a volatile memory register coupled to the authentication engine, the nonvolatile memory array being coupled to the authentication engine and to the second interface;
   maintaining a monotonic count within the nonvolatile memory array of the authentication integrated circuit die;
   receiving, by the authentication integrated circuit die, a request associated with a keyed-HMAC for providing the monotonic count;
   furnishing the monotonic count from the authentication engine to one of the contacts via the second interface, the second interface being electrically coupled to at least some of the contacts;
   receiving, by the authentication integrated circuit die, a request associated with the keyed-HMAC for incrementing the monotonic count; and
   incrementing the monotonic count in the authentication integrated circuit die.

4. The method of claim 3 further comprising:
   computing a derived key based upon session data and the root key; and
   storing the derived key in the volatile memory register;
   wherein the keyed-HMAC is based upon the derived key.

\* \* \* \* \*